United States Patent [19]

Cosby

[11] 4,255,807
[45] Mar. 10, 1981

[54] ERROR TESTING OF RECORDING MEDIA SUCH AS MAGNETIC TAPE

[75] Inventor: Phillip A. Cosby, Arlington, Tex.

[73] Assignee: Graham Magnetics Incorporated, North Richmond Hills, Tex.

[21] Appl. No.: 970,666

[22] Filed: Dec. 18, 1978

[51] Int. Cl.³ .................... G01R 31/28; G06F 11/00
[52] U.S. Cl. .................................. 371/21; 324/212; 360/25; 371/65
[58] Field of Search ............... 340/146.1 F; 360/25, 360/31, 38, 53; 324/210, 212; 235/302.3; 371/21, 65

[56] References Cited

U.S. PATENT DOCUMENTS

| | | | |
|---|---|---|---|
| 3,517,305 | 6/1970 | Schwartz et al. | 324/212 |
| 3,530,384 | 9/1970 | Zussman | 324/212 |
| 3,586,965 | 6/1971 | Whysong | 324/212 |
| 3,633,187 | 1/1972 | Proctor et al. | 360/25 |
| 3,655,969 | 4/1972 | Chernow et al. | 235/302.3 |
| 3,826,975 | 7/1974 | Geller | 324/212 |

OTHER PUBLICATIONS

Fraim et al., Checking the Quality of Magnetic Recording Tape, IBM Tech. Disclosure Bulletin, vol. 14, No. 9, Feb. 1972, pp. 2629-2630.

*Primary Examiner*—Charles E. Atkinson
*Attorney, Agent, or Firm*—Robert A. Cesari; John F. McKenna; Andrew F. Kehoe

[57] ABSTRACT

Process and apparatus for detecting and evaluating defects in memory-retaining characteristics of magnetic tape, said process and apparatus providing means for sensing an initial error in a first track of the tape and then relating the initial error to all other errors which are sensed in other tracks of the tape within a preselected segment of tape the start of which coincides with the location of the initial error. Each of the other sensed errors within the segment defined by the initial error defines its own error evaluation segment over which it is evaluated. Thus, depending upon the error content of the tape, a plurality of overlapping error evaluation segments may be defined. Each error sensed on the tape is processed and categorized as either a one-, two- or three-track error depending upon the number of other track errors sensed within its segment. The apparatus includes means for counting and reporting the number of each type of error sensed on the tape.

26 Claims, 3 Drawing Figures

ERROR TESTING OF RECORDING MEDIA SUCH AS MAGNETIC TAPE

BACKGROUND OF THE INVENTION

This invention relates to a process, and apparatus for carrying out the process, for testing recording media, for example, magnetic tape of the type used for digital storage of data in the computer industry.

It is well known that magnetic tape is seldom free from all defects in magnetic storage capacity. This is true for newly-manufactured tape; but, it is particularly true of used magnetic tape where defects may have accrued during many writing and subsequent reading cycles. Scratches, presence of foreign debris such as dust, or presence of debris generated by the read and write equipment, can all contribute to the presence of an error. An error is any condition of the tape which results in the absence or non-functionality of the magnetic material which is supposed to form one or more information recording sites, i.e., one or more "bits". It has been recognized for some time that such tape should be tested for error content before reuse. Many customers require that the testing be carried out on new tape.

To understand the testing of magnetic tape, it is necessary to understand that a tape usually comrpises a number of parallel, data-containing tracks running along the length of the tape. The tape, on being used, will be magnetically encoded with information according to one of a number of industry-accepted formats. The formats presently in use include a so-called 6250 CPI, group code recorded (GRC) format and a 1600 BPI/3200 fci format. These formats provide that the tape be divided along its length into a pattern of a variety of segments each to carry information having a different function.

The most sophisticated of pre-existing tape testing apparatus is believed to operate as follows: The apparatus would detect a first error, assume it takes place at the start of a certain increment of the length of the tape, identify errors in the same increment, and assume that all errors in the same increment are cumulative. This procedure will report three one-track errors as one three-track error, two two-track errors and three one-track errors. In actual practice such numbers may be modified by appropriate steps. For example, the number of one-track errors is found by subtracting the number of two- and three-track errors from the total of errors to give the number of one-track errors and subtracting the number of three-track errors from the two-track errors to get the number of two-track errors. No correction is required for the number of three-track errors.

Thereupon, the old apparatus once again proceeds to test the tape and will take no further step to evaluate the tape until the next error causes it to evaluate the increment of the tape immediately following this next error. At this point, the apparatus will again scan the next increment of tape as indicated above. The magnetic tape industry has found this procedure of some use in giving what is at least a rough and comparative method for determining the error content in tape.

However, it is to be noted that there is a strong probability that the above-described procedure will not fully evaluate the relationship of all errors to one another. For example, if there is an error at the end of one increment of tape, there is no basis for relating that error to another error immediately following that increment but falling within the next increment of tape. As indicated hereinafter, the inventor now believes a faulty aspect of such test procedures known to the art to be their failure to evaluate the full potential for harm that each error possesses.

DEFINITIONS

"Position on the tape" is used to define both the track position and the longitudinal position along the tape.

"Segment of the tape" is a longitudinal region of the tape which is selected, for each error to be evaluated, as an appropriate portion of the tape over which to evaluate the error with respect to other errors. For the 6250 CPI format, for example, a segment may be about 0.1746 inches.

An "error" is said to exist on the tape when one or more test bits in a given track which have been written on the tape are not detected and are therefore missing. Thus, for example, depending upon the error sensitivity desired, an error may be said to exist in a given track when a single bit is missing, when two consecutive bits are missing, when three consecutive bits are missing, or when more than three consecutive bits are missing. It is to be noted that "missing" does not define a complete absence of magnetic output, but denotes a sufficiently low magnetic output capability that it fails to meet an output standard set as acceptable for a given testing procedure. The standard will normally be selected with a view toward the application in which the tape will be used.

A "one-track error" is defined as an error on a single track.

A "two-track error" is the co-existence of any pair of errors each on different tracks within an error evaluation segment. For example, if there is a second error on a different track within that given segment of tape being scrutinized in connection with the evaluation of a first error, the first error will be categorized as a two track error.

A "three-track error" is the co-existence of any three or more errors each of which is on a different track within a segment. Thus, for example, if there are two or more additional errors each on a different track within that given segment of tape being scrutinized in connection with the evaluation of a first error, the first error will be categorized as a three-track error.

SUMMARY OF THE INVENTION

The present invention aims to provide more detailed, useful and reliable information concerning the error content of recording media, such as magnetic tape, than even the most sophisticated of pre-existing testing processes and apparatus.

In accordance with the present invention, an initial error sensed in a first track of a tape defines an error evaluation segment of a preselected length. The initial error is evaluated and categorized based upon the presence or absence of any other errors sensed from other tracks of the tape within the preselected segment. Thus, for example, if a first error is detected in a first track of the tape and no other errors are detected in any other tracks of the tape within a preselected segment of the tape the start of which is defined by the first error, then the first error will be categorized as a one-track error. If, in addition to the first error, a second error is detected within the first error's tape segment in a track other than the first track, the first error will be categorized as a two-track error. The second error will also define its own error evaluation segment over which it is evaluated and categorized. If, in addition to the first error, two or more additional errors are detected within the first error's segment, each of which additional errors is in a different track which is other than the first track, the first error will be categorized as a three-track error. In addition, each of the additional errors will define its own error evaluation segment over which it is evaluated and categorized.

As a result, depending upon the error content of the tape, a plurality of overlapping error evaluation segments may be defined. Each error that is evaluated is related to the other track errors that follow it within its evaluation segment regardless of whether the other detected errors also define, or occur within, other evaluation segments. This contrasts with pre-existing tape evaluation processes and apparatus in which error evaluation segments do not overlap and in which there is no basis for interrelating errors that may be proximate to one another but that fall within separate evaluation segments.

BRIEF DESCRIPTION OF THE DRAWING

The foregoing and other features and advantages of the invention will be better understood from the following detailed description taken in conjunction with the accompanying drawing in which.

DETAILED DESCRIPTION OF ILLUSTRATIVE EMBODIMENT

Figure 1:
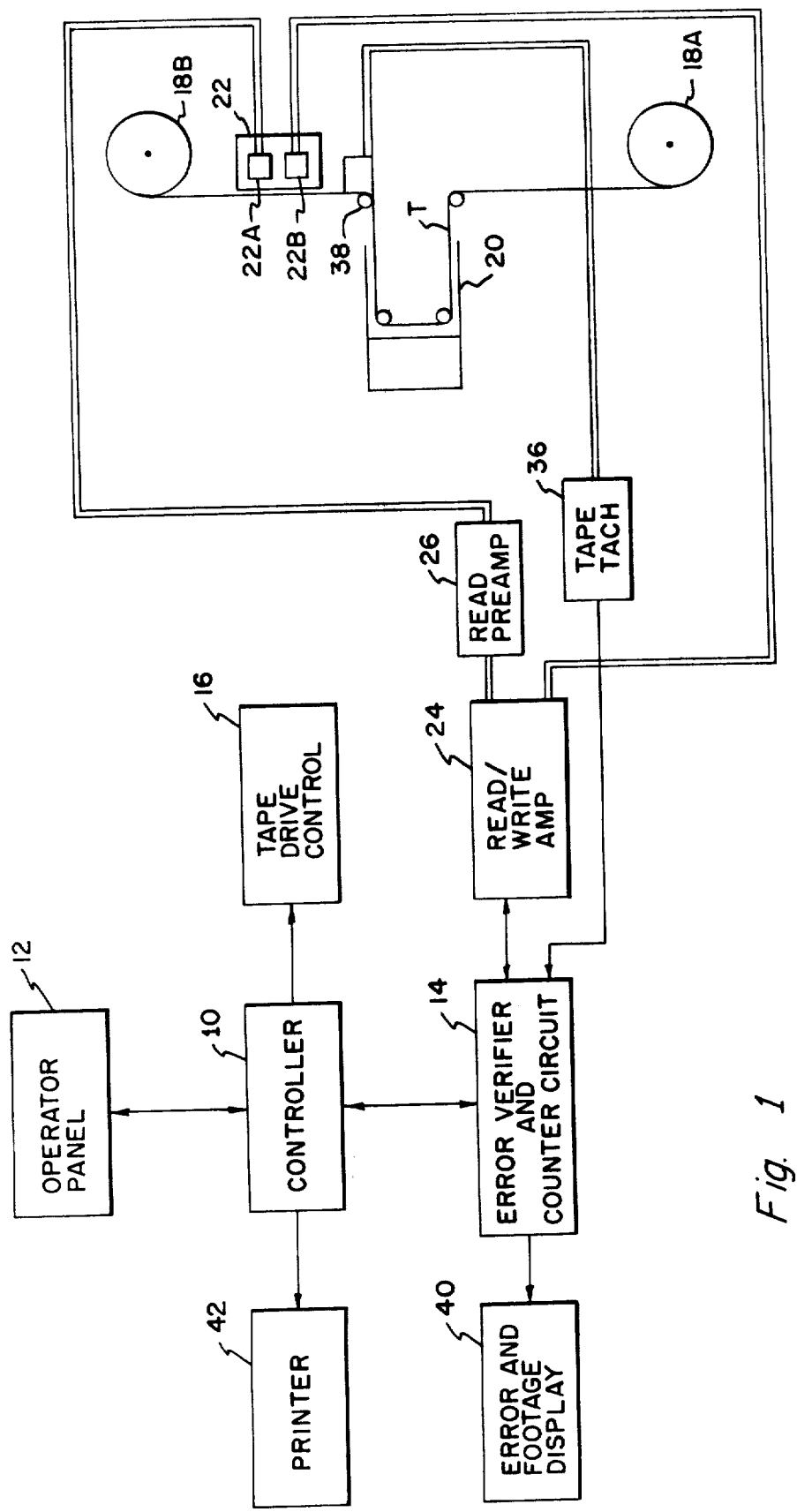
FIG. 1 is a generalized block diagram showing illustrative apparatus for carrying out a process according to the invention.

FIG. 1 is a generalized block diagram of one specific, illustrative embodiment of the present invention for detecting and evaluating errors in magnetic tape. Overall control over the apparatus is provided by a controller 10 which is illustratively a program controlled digital computer which may be a conventional microprocessor such as the Model 8080 microprocessor available commercially from Intel. The program stored in the controller 10 determines the sequence of operations performed by the apparatus a test sequence and makes command decisions based upon inputs received from an operator panel 12 and from an error verifier and counter circuit 14. The controller 10 controls a tape reel drive control circuit 16 which, in turn, controls servomotors (not shown) that drive a pair of magnetic tape reels 18A and 18B. A magnetic tape T to be evaluated is fed from one reel 18A into a vacuum column 20 and thence to the second reel 18B. The operator panel 12 is illustratively comprised of a plurality of switches which, among other things, enable an operator of the apparatus to select, through the controller 10 and tape reel drive control circuit 16, the speed and direction of travel of the tape T through the column 20. The tape reel drive control circuit 16 would typically include conventional tape speed feedback means which enable the controller 10 to determine when the tape T is up to speed and to maintain a desired tape speed.

Positioned within the column 20 is a magnetic read/write head mechanism 22 which, under the control of the conroller 10, can write data in the form of magnetic bits on the tape T, read previously written data bits from the tape T and erase the tape T. The mechanism 22 includes a read head 22A and a write head 22B. As noted, the tape T typically includes a plurality of parallel, data-containing tracks (e.g., nine such tracks) spaced across its width and running along its length. The read head 22A and write head 22B each actually comprise a corresponding plurality of heads which enable a bit pattern to be written, read and erased from each track independently. The tape drive control 16 is also equipped to sense beginning-of-tape (BOT) and end-of-tape (EOT) markers on the tape T.

A read/write amplifier circuit 24 can be activated by the controller 10 to generate test bit signals which are written on the tape T through the write head 22B. Test bit signals read from the tape T by the read head 22A pass through a preamplifier circuit 26 and the read/write amplifier circuit 24 to the error verifier and counter circuit 14. It has been found advantageous to electromagnetically shield the cable running from the read head 22A to the preamplifier circuit 26 to eliminate crosstalk and related electromagnetic interference problems that are typically experienced without such shielding. A useful shielding material for this purpose is a tape made with metal-pigmented shielding paint supplied by the Cobaloy Company of Arlington, Texas under the trade designation Cabaloy P212.

As noted previously, in error detection, a given bit is considered missing from the tape T if the magnetic output corresponding to that bit is below a standard set as acceptable for a given testing procedure. That standard is generally referred to as the clipping level. For this reason, the operator panel 12 may include a switch (not shown) which enables the operator to select the clipping level to be used in the error detection by the apparatus. The controller 10, in response to the setting on the clipping level switch, sends a corresponding control signal to the read/write amplifier circuit 24. The circuit 24 may include a conventional comparator that receives the clipping level control signal and the output of the read preamplifier circuit 26, compares the two, and generates a "bit present" signal only if a given bit has sufficient magnetic output to exceed the selected clipping level. Actually, there may be one such comparator for each track on the tape T. The "bit present" signals from the read/write amplifier circuit 24 are coupled to the error verifier and counter circuit 14.

A tape tachometer 36 provides the error verifier and counter circuit 14 with signals indicative of the length (e.g., in feet) of tape T that passes the read/write head mechanism 22 during a test sequence. The tachometer 36 may comprise an optical tachometer that is associated with a tape capstan 38 to produce a pulse for each fixed length (e.g., each foot) of tape T that passes the head mechanism 22.

Error and footage signals are coupled from the error verifier and counter circuit 14 to an error and footage display 40. The display 40 provides a visual indication of the type and number of errors detected on the tape T during a test sequence and of the tape footage passing the head mechanism 22 during the sequence. The display 40 preferably includes a separate display unit for each type of error (i.e., one-, two-, and three-track errors) and for the tape footage, each unit being continuously updated during the test sequence.

The controller 10 also controls a printer 42. The printer 42 may be activated by an associated switch on the operator panel 12 to print indications of the number of a selected type of error (e.g., one-, two-, or three-track) detected at predetermined tape footage intervals during the test sequence and also to print error and footage totals at the end of the sequence.

The operator of the apparatus shown in FIG. 1, after loading the tape T, selects and initiates a test sequence by activating an associated switch on the operator panel 12. The controller 10 responds by initiating a predetermined sequence of operations which comprise the test sequence. For example, the controller 10 may initially run the loaded tape T forward until the BOT marker is sensed by the tape drive control circuit 16. The tape T may then be rewound to a predetermined position before the BOT marker at which point a write test is begun. During the write test, the controller 10 may activate the read/write amplifier circuit 24 to write a string of consecutive test bits (e.g., binary "1's") on each track of the tape T. The test bits are read back again from each track by the read head 22A. The error verifier and counter circuit 14 detects missing bits from each track, categorizes the missing bits as one-, two- or three-track errors, counts the errors and controls the display 40 to provide a visual indication of the error and footage totals. The controller 10 terminates the write test when the EOT marker is sensed by the tape drive control circuit 16. The tape T may then be rewound to the BOT marker to conclude the test sequence. The printer 42, at the end of test sequence, is activated by the controller 10 to print the error and footage totals.

Figure 2:
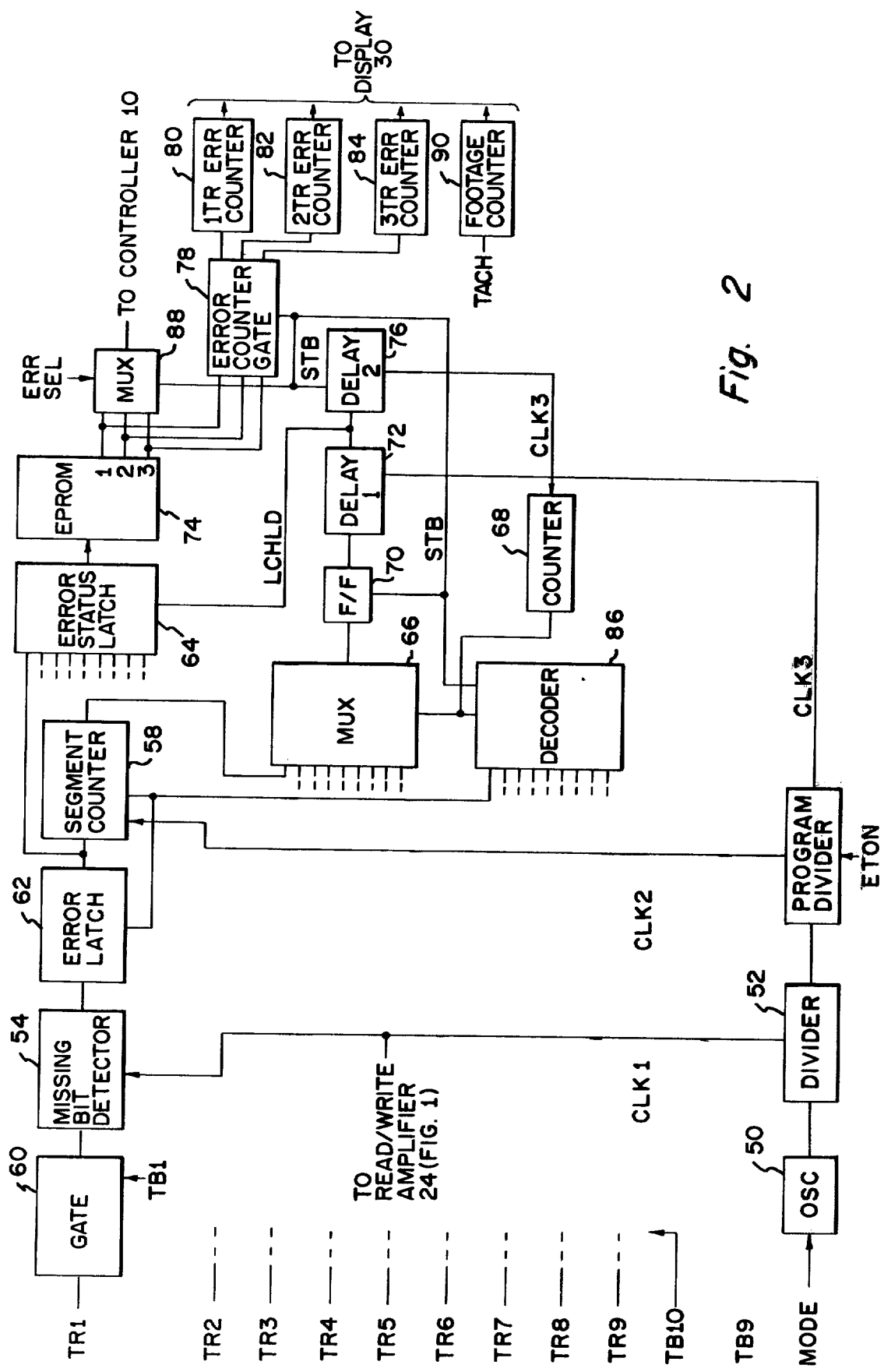
FIG. 2 is a block diagram illustrating further details of an error verifier and counter circuit shown in FIG. 1.

FIG. 2 of the drawing shows further details of the error verifier and counter circuit 14 of FIG. 1 and shows how the circuit 14 electronically detects, categorizes and counts errors on the tape T in accordance with one illustrative example of the invention. The circuit 14 includes an oscillator 50 which provides the timing for the circuit. The output frequency of the oscillator 50 is determined by a conrol signal MODE from the controller 10. The MODE signal, in turn, is determined by a switch on the operator panel 12 of FIG. 1 by which the operator may select the encoding format to be used in writing on the tape T. Thus, for example, the MODE signal may have a first value if the 6250 CPI format is to be used and a second, different value if the 1600 BPI format is to be used. The oscillator 50 produces a correspondingly different output frequency for each selected format.

The output of the oscillator 50 is passed to a divider 52 which produces a first clock signal CLK1. The CLK1 signal is coupled to a missing bit detector 54 and is also used as a timing signal for the read/write amplifier circuit 24 of FIG. 1 to control the writing of the test bits on the tape T during the write test. The output of the divider 52 is passed to a programmable divider 56 which produces second and third clock signals CLK2 and CLK3. The CLK2 signal is coupled to a segment counter 58. The frequency of the CLK2 signal determines the segment of the tape T over which each sensed error is evaluated with respect to other errors sensed within the segment. For the 6250 CPI format, for example, the segment advantageously may be selected as one comprising 1580 bits, which corresponds to approximately 0.1746 inches of tape. Other segment lengths may be used as desired. The segment length is determined by the state of control signals ETON from the controller 10, which control the programmable divider 56 and determine the frequency of the CLK2 signal. The CLK3 signal, which is at a much higher frequency than the CLK2 signal, is coupled to various other components in the circuit 14.

The "bit present" signals for each tape track from the read/write amplifier circuit 24 of FIG. 1 are coupled to the circuit 14 as signals TR1 through TR9. Each of the TR1 through TR9 signals is fed through a group of components which serves to sense errors in its corresponding tape track. For ease of illustration, the error sensing components are shown in FIG. 2 only for the TR1 track. It should be understood, however, that the circuit 14 includes a corresponding set of error sensing components for each of the other tracks TR2 through TR9.

The TR1 output signals are passed to a conrol gate 60 where they are gated with a track enable signal TB1 from the controller 10. The presence of the track enable signal TB1 causes the TR1 signals to pass to the missing bit detector 54. If the TB1 signal is absent, the output signals for the TR1 track are not passed by the gate 60 and the TR1 track is eliminated from the evaluation. Similar track enable signals TB2 through TB9 are coupled from the controller 10 to corresponding control gates 60 in the circuit 14. The track enable signals TB1 through TB9 enable the controller 10 to select which of the nine tape tracks are to be evaluated for errors.

The missing bit detector 54 counts each missing bit and generates an output when a preselected number of missing bits is detected. For purposes of the illustrative embodiment, an error is defined as occurring in a given track when three consecutive bits are found missing from that track. Thus, the detector 54 illustratively generates its output when three consecutive bits are detected as missing. The number of missing bits selected as constituting an error depends upon the error sensitivity desired for the apparatus. Defining an error as comprising three consecutive missing bits has been found to provide adequate sensitivity for most testing purposes.

The detector 54 may comprise a conventional "count-to-three" counter (e.g., of the type sold under the IC component designation 74LS175) that counts the CLK1 pulses and that has its CLEAR input connected to the output of the control gate 60. Each "bit present" signal that is detected thus clears the counter. The counter reaches a count of three and generates an output only if three "consecutive "bit present" signals are missing. If an error is defined as consisting of some number of missing bits other than three, then the counter used in the detector 54 would be appropriately selected to provide an output in response to a corresponding number of CLK1 pulses.

Assume that the first error detected on the tape T during the test sequence is detected in the TR1 track. That TR1 track error causes missing bit detector 54 to generate an output that sets an error latch 62. The output of the latch 62 activates the segment counter 58 and is also coupled as one input to an error status latch 64. The other inputs to the error status latch 64 come from corresponding error latches 62 associated with each of the other tracks TR2 through TR9.

The segment counter 58, when activated, starts counting CLK2 pulses. Upon receiving a predetermined count Corresponding to 1580 bits (i.e., the selected error segment), the status of the output of the counter 58 changes. A multiplexer 66 has an input connected to the output of segment counter 58 and to the outputs of each of the other corresponding segment counters 58 associated with the other tracks TR2 through TR8. The multiplexer 66 is forced to scan through each of its inputs at a rapid rate by a counter 58 which is controlled by the CLK3 pulses. Upon sensing a status change on one of its inputs, the multiplexer 66 sets a flip-flop 70.

The output of the flip-flop 70 is connected to a first delay component 72. On the falling edge of the first CLK3 pulse following the setting of the flip-flop 70, the delay component 72 emits a latch pulse LCHLD. The LCHLD pulse causes the TR1 track error signal from the error latch 62, and all other track error signals which have been coupled to the inputs of the error status latch 64 during the counting time of the TR1 track segment counter 58, to be latched into the error status latch 64. Thus, the latch 54, after receiving the LCHLD pulse, contains information concerning the error sensed in the TR1 track together with information concerning any other errors subsequently sensed in the other tracks within the 1580 bit segment of tape that commences at the location of the error in the TR1 track.

The outputs of the error status latch 64 address an erasable programmable read-only memory 74 (e.g., of the type sold under the IC component desgination 2708) which is programmed to categorize the error in the TR1 track and to issue an output code which is indicative of its type (i.e., one-, two-, three-track). The categorization is made based upon the presence of any other errors in the other tracks TR2 through TR9 within the tape segment, the start of which is defined by the TR1 track error. Thus, for example, if the TR1 track error is the only one sensed within the segment, the memory 74 issues an output code indicative of a one-track error. If, in addition to the TR1 track error, another error is sensed within the segment in a track other than the TR1 track, the memory 74 issues an output code indicative of a two-track error. If, in addition to the TR1 track error, two or more additional errors are sensed within the segment, each of which is in a different track which is other than the TR1 track, the memory 74 issues an output code indicative of a three-track error. These output codes appear at one of the three ouputs of the memory 74 labelled 1, 2 and 3 in FIG. 2.

The output of the first delay component 72 is connected to a second delay component 76. On the falling edge of the third CLK3 pulse following the setting of the flip-flop 70, the delay component 76 emits a strobe pulse STB. The STB pulse enables an error counter gate 78 which couples the error code from the output of the memory 74 to the appropriate one of three error counters 80, 82 and 84. The appropriate one of one-track error counter 80, two-track error counter 82 and three-track error counter 84 is thus incremented by one count. The outputs of the counters 80, 82 and 84 control the respective error type display units in the display 40 of FIG. 1.

The STB pulse from the delay component 76 is also coupled to the flip-flop 70 and to a decoder 86 which is coupled to the multiplexer 66 and which has an output connected to the segment counter 58 and the error latch 62 associated with each of the TR1 through TR9 tracks. The flip-flop 70 is reset by the STB pulse, enabling the multiplexer 66 to initiate the categorization and counting of other errors subsequent to the TR1 track error. The decoder 86, in response to the STB pulse, clears the segment counter 58 and the error latch 62 associated with the TR1 track, enabling those components to process other errors in the TR1 track.

The STB pulse is also coupled to a multiplexer 88 which is connected to the outputs of the memory 74. The multiplexer 88 receives an error select control signal ERR SEL from the controller 10. The ERR SEL signal is generated by the controller 10 under the congtrol of a switch on the operator panel 12 which enables the operator to select the one of the three error types to be printed out during the test sequence by the printer 42. The multiplexer 88 couples pulses indicative of the number of errors of the selected type to the controller 10. That number is then printed by the printer 42 during the test sequence.

A TACH signal from the tape tachometer 36 of FIG. 1 is applied to a footage counter 90 in the circuit 14 of FIG. 2 which counter is incremented according to the length of tape T passing the head mechanism 22 during the test sequence. Like the error counters 80, 82 and 84, the output of the footage counter 90 is coupled to the display 40 when it controls the footage display unit.

The LCHLD and STB pulses from the delays component 72 and 76, respectively, are delayed relative to the setting of the flip-flop 70 so as to compensate for the progragation delay of the error signals through the error status latch 64 and the memory 74.

Figure 3:
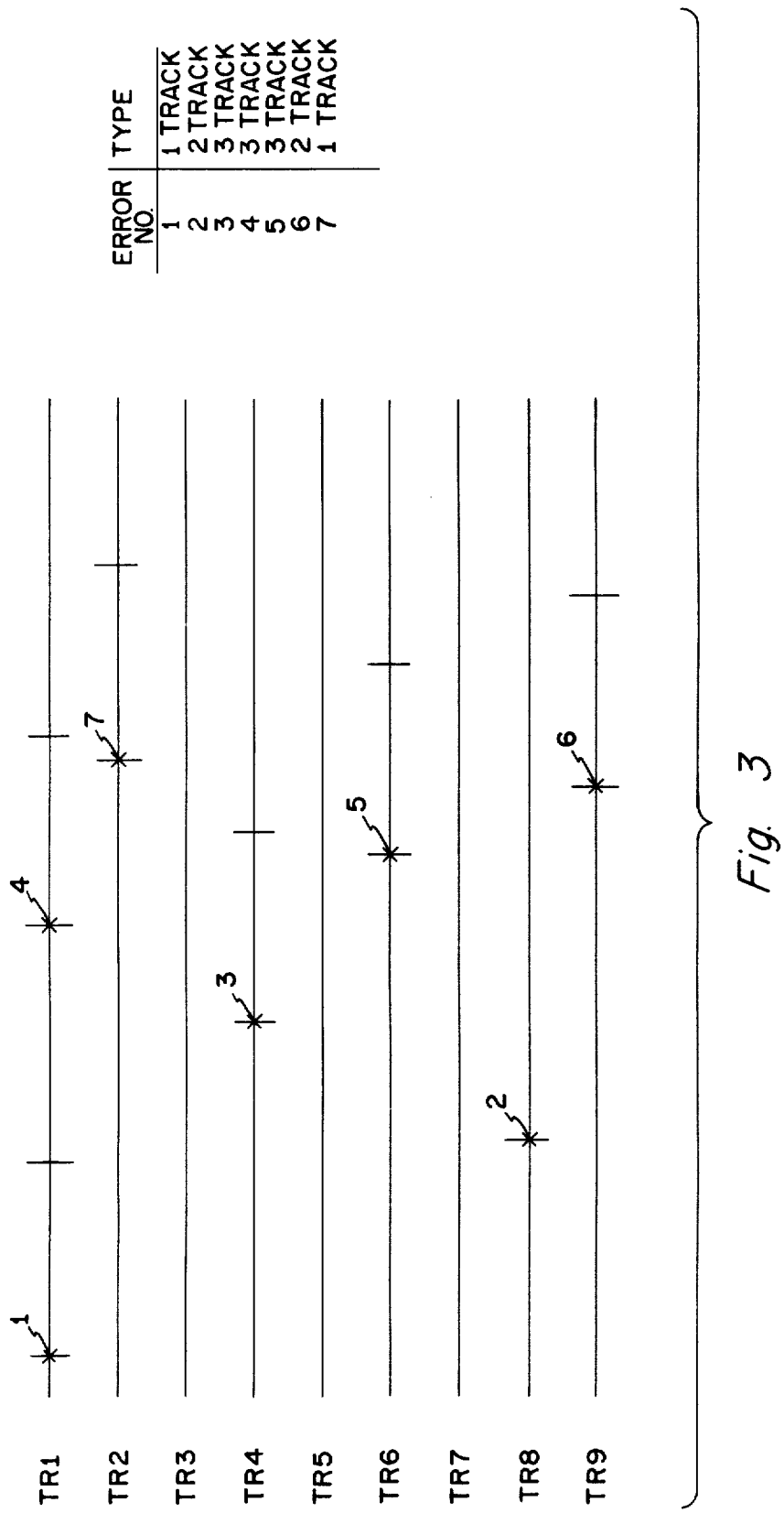
FIG. 3 illustrates graphically how errors may be categorized utilizing the illustrative apparatus shown in FIGS. 1 and 2.

FIG. 3 of the drawing illustrates graphically a length of the tape T containing several errors in various of its tracks TR1 through TR9. Each error is represented by an "X" intersecting a horizontal line corresponding to the track in which the error occurs and is labelled by a number from 1 to 7. Each of the errors 1 through 7 defines its own error evaluation segment which is represented by the vertical lines intersecting the track line in which the error occurs. The illustrative apparatus of FIG. 2 categorizes each error 1 through 7 based upon the number of other errors that are sensed in other tracks within the segment defined by the error in question. The table at the right of FIG. 3 specifies the error type for each of the errors 1 through 7 shown in FIG. 3.

Thus, it can be seen that, with the illustrative apparatus, sensed track errors define corresponding error evaluation segments. Error evaluation segments can, and often do, overlap. Errors that are proximate to one another are properly interrelated even though they may define, or occur within, different evaluation segments. The apparatus thus provides detailed, useful and reliable information concerning the error content of the tape T.

It should be understood that the apparatus shown in the drawing and described above is intended to illustrate rather than limit the invention. Numerous modifications and embellishments may be made to the illustrative apparatus by those skilled in the art without departing from the scope of the invention as defined by the appended claims. It will be noted, for example, that, in interests of structural simplicity, the illustrative apparatus does not process a second error in the same track as a first error that has actuated the segment counter 58 for that track if the second error occurs within the selected segment bit length (e.g., 1580 bits) of the first error. If, however, a more detailed evaluation is desired, the illustrative apparatus could readily be modified to process multiple errors on the same track even though they are proximate to one another. One way of accomplishing this is simply by reducing or shortening the error evaluation segment bit length. Alternatively, instead of using a single error latch 62 and a single segment counter 58 for each track, a plurality of such components could be used for each track. Each successive error latch 62 could be enabled in respsonse to the latching of an error into the latch 62 preceding it. Successive errors in the same track could then latch successive ones of the latches 62, each of which would, in turn, enable its own segment counter 58.

The apparatus described, or modifications thereof, may also have utility in areas other than magnetic tape error evaluation. The apparatus could, for example, be used in a signal monitoring system to analyze a multitrack recording medium, which may or may not be magnetic tape, and to categorize information sites or bits on the medium in terms of the number of tracks in which they occur. Other uses of the apparatus will be recognized by those skilled in the art.

It is thus the object of the appended claims to cover these and other modifications as come within the true scope of the invention.

What is claimed as new and desired to be secured by Letters Patent of the United States is:

1. Apparatus for testing and evaluating errors in a recording medium of the type including a plurality of separate recording tracks, said apparatus comprising:
   (a) means to sense errors in respective tracks of the medium;
   (b) means responsive to said error sensing means to store for each sensed error a signal representative of the error and of the track in which the error occurs;
   (c) means responsive to said error sensing means to define for each sensed error a preselected error evaluation segment of the medium which segment includes that error; and
   (d) means to process for each sensed error the signal representative of that error and its track and the signals representative of other errors sensed in other tracks of the medium within the preselected error evaluation segment associated with that error to categorize that error as
      (1) a one-track error,
      (2) a two-track error, or
      (3) a three-track error.

2. The apparatus of claim 1 further including means responsive to said processing means to count and to report the number of each one-track error, two-track error, and three-track error sensed on the medium being tested.

3. The apparatus of claim 2 in which said reporting means comprises error counter means connected to said processing means to separately count the number of one-track, two-track and three-track errors sensed on the medium being tested and error display means connected to said error counter means to separately display the number of sensed one-track, two-track and three-track errors.

4. The apparatus of claim 1 in which said error sensing means comprises
   (i) means to write a string of consecutive test bits in each track to be tested and to read the test bits back from each such track, and
   (ii) means associated with each track to count the number of read test bits that fail to exceed a preset bit clipping level, each of said bit counting means generating an error indicating output for its associated track when a predetermined number of test bits below the clipping level is sensed in that track.

5. The apparatus of claim 4 in which each of said bit counting means generates the error indicating output for its associated track when more than one consecutive test bit below the clipping level is sensed in that track.

6. The apparatus of claim 4 further including means to vary the test bit clipping level.

7. The apparatus of claim 1 further including clock means to generate clock pulses and in which said segment defining means comprise segment counter means associated with each track and connected to receive the clock pulses from said clock means, each of said segment counter means being responsive to the sensing of the error in its associated track to count the clock pulses and to generate a signal indicative of the end of the segment upon achieving a predetermined clock pulse count corresponding in value to the desired segment length.

8. The apparatus of claim 7 in which said processing means includes means responsive to the receipt of the segment end indicating signal from one of said segment counter means which has been activated by the sensing of the error in its associated track to generate an output code for that error indicative of
   (1) a aone-track error if no other errors are sensed in any other tracks during the counting time of said one of said segment counter means;
   (2) a two-track error if one other error is sensed in another track during the counting time of said one of said segment counter means, and
   (3) a three-track error if two or more other errors have been sensed each in another track during the counting time of said one of said segment counter means.

9. The apparatus of claim 7 further including means to vary the frequency of the clock generated by said clock means and thereby to vary the length of the segment over which each sensed error is evaluated.

10. The apparatus of claim 4 in which said error sensing means further comprises error latch means associated with each track, each of said error latch means being connected to the output of said bit counting means for that track and responsive to the error indicating output of said bit counting means to generate the signal representative of the sensed error in its associated track.

11. The apparatus of claim 10 in which said error sensing means further comprises error status latch means including a plurality of inputs connected respectively to the outputs of said error latch means for each track to store the signals representative of the sensed errors in each track.

12. The apparatus of claim 11 in which said processing means comprises a programmable read only memory connected to said error status latch means, said memory being programmed to generate an output code indicative of the type of each sensed error according to the signals representative of the other sensed errors stored in said error status latch means.

13. The apparatus of claim 11 further including clock means to generate clock pulses and in which said segment defining means comprise segment counter means associated with each track and connected to receive clock pulses from said clock means, each of said segment counter means being responsive to the signal generated by said error latch means in response to the error sensed in its associated track to count the clock pulses and to generate a signal indicative of the end of the error evaluation segment upon achieving a predetermined clock pulse count corresponding to the desired segment length.

14. The apparatus of claim 13 further including means having a plurality of inputs connected respectively to said segment counter means for each track to scan relatively rapidly through its inputs and to generate a latch signal which latches the signals representative of the sensed errors into said error status latch means in response to the receipt of the segment end indicating signal from one of said segment counter means.

15. The apparatus of claim 14 in which said scanning means includes delay means to delay the generation of the latch signal a predetermined period of time after the receipt of the segment end indicating signal from said one of said segment counter means.

16. The apparatus of claim 14 in which said scanning means includes means to reset said one of said segment counter means after the generation of the latch signal.

17. The apparatus of claim 1 further including means to move the recording medium relative to said error sensing means and means to generate a signal representative of the length of the recording medium that is moved relative to said error sensing means.

18. The apparatus of claim 17 further including recording medium length counter means to count the number of length units of the medium that is moved relative to said error sensing means and recording medium length display means connected to said recording medium length counter means to display the length units number.

19. The apparatus of claim 1 in which the recording medium is a multiple track magnetic tape recording medium.

20. A process for testing and evaluating errors in a recording medium of the type including a plurality of separate recording tracks, said process comprising the steps of:
(a) sensing a first error and storing a signal representative of the track in which it occurs;
(b) defining for the first error a preselected error evaluation segment of the medium which segment includes the first error;
(c) sensing other errors in other tracks of the medium within the preselected segment defined by the first error, and storing signals representative of the tracks in which the other errors occur,
(d) processing said signals representative of the first error and of the other errors within the segment to categorize the first error as
 (1) a one-track error,
 (2) a two-track error, or
 (3) a three-track error; and
(e) carrying out steps (a), (b), (c) and (d) for each other sensed error in the segment and each other error sensed along the medium being tested.

21. The process of claim 20 further including the steps of reporting the number and type of each sensed error on the medium being tested.

22. The process of claim 21 in which said reporting step includes the step of separately counting and displaying the number of one-track, two-track and three-track errors sensed on the medium being tested.

23. The process of claim 20 in which said error sensing steps include the steps of writing a string of consecutive test bits in each track to be tested, reading the test bits back from each such track and counting the number of read test bits that fail to exceed a preset bit clipping level, an error being sensed in one of the tracks when a predetermined number of test bits below the clipping level in sensed in that track.

24. The process of claim 20 further including the step of generating clock pulses of a predetermined frequency and in which said segment defining step includes the steps of counting the clock pulses in response to the detection of the first error and generating a signal indicative of the end of the segment upon achieving a predetermined clock pulse count corresponding in value to the length of the desired segment.

25. The process of claim 24 in which said processing step is reinstated at a predetermined time after the generation of the segment end indicating signal.

26. The process of claim 20 further including the step of reporting the length of the medium over which errors are sensed.

* * * * *